Figure 5:
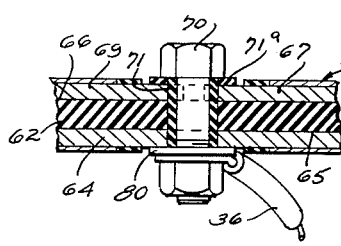

April 3, 1956  M. W. BRAINARD  2,740,924
DRY PLATE TYPE RECTIFIER
Filed July 5, 1951  2 Sheets-Sheet 1
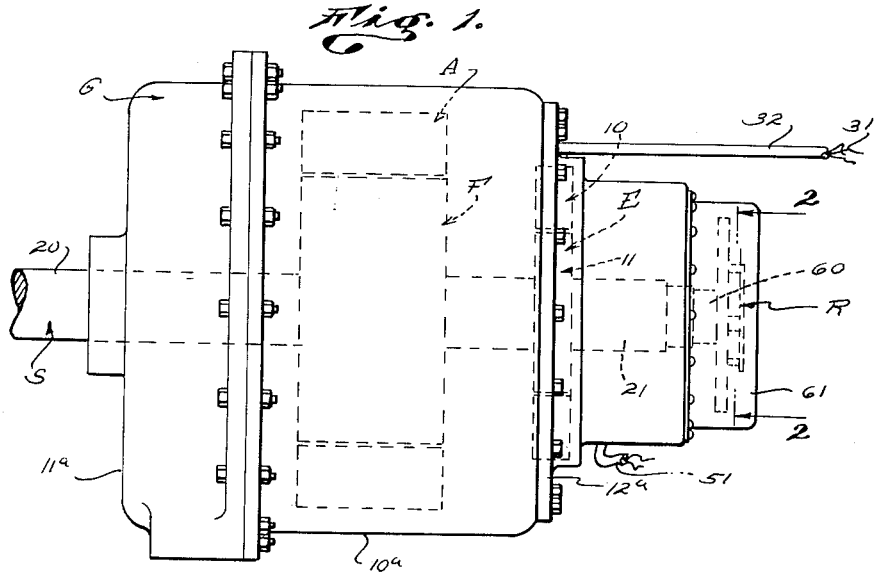
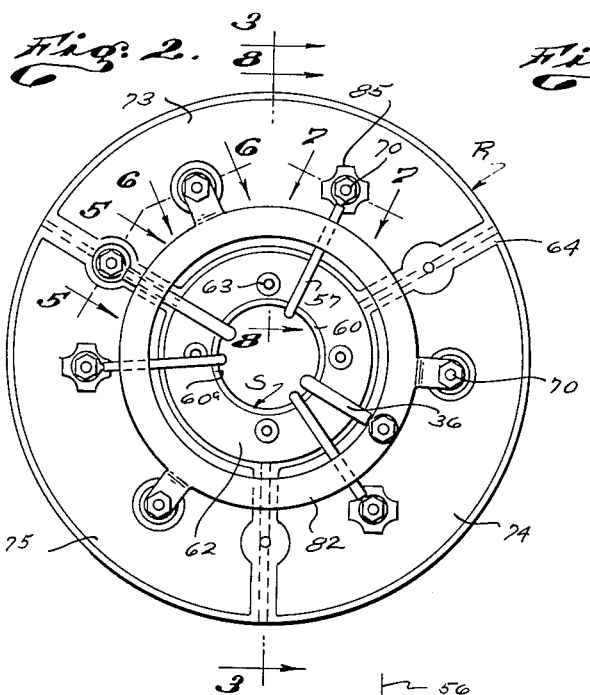
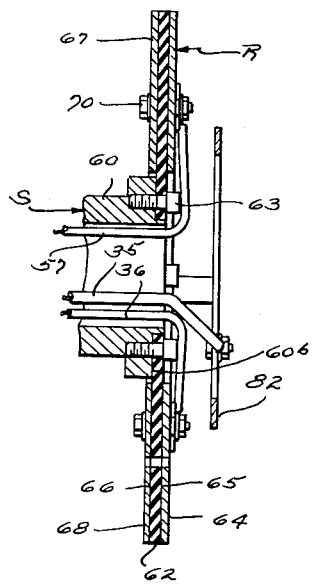
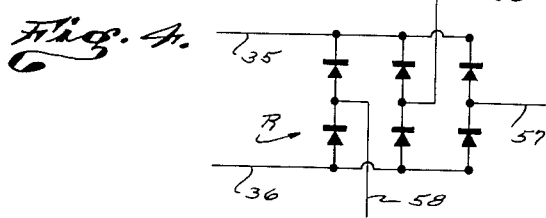
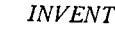
INVENTOR.
Maurice W. Brainard
BY
Attorney April 3, 1956  M. W. BRAINARD  2,740,924
DRY PLATE TYPE RECTIFIER Filed July 5, 1951  2 Sheets-Sheet 2

INVENTOR.
Maurice W. Brainard
BY
Attorney

United States Patent Office 2,740,924
Patented Apr. 3, 1956

2,740,924

DRY PLATE TYPE RECTIFIER

Maurice W. Brainard, Los Angeles, Calif., assignor to O'Keefe & Merritt Company, Los Angeles, Calif., a corporation of California Application July 5, 1951, Serial No. 235,272

17 Claims. (Cl. 317—234)

This invention has to do with a dry plate type rectifier and it is a general object of the invention to provide such a device and features of construction in such a device whereby effective, efficient and dependable rectifying action is gained.

Dry plate type rectifiers such as this invention is concerned with are applicable to, or can be incorporated to advantage in various electric machines or circuits where alternating current is required to be converted or rectified to direct current. Such a machine or situation is set forth and claimed in my copending application entitled "Electrical Machines" filed April 27, 1950, Serial No. 158,495, of which this application is a continuation-in-part.

It is a general object of this invention to provide a rectifier of the type referred to which is in the form or nature of a simple, compact unitary device that can be easily and advantageously applied to other equipment or to electric machines without complicating them or rendering them costly or in any way impractical for general commercial use. The rectifier of this invention can, in a typical case, be applied to the shaft of an electric machine, say, for instance, to the end of a rotor shaft, so it can be installed and removed without materially disturbing other parts.

It is a further object of this invention to provide a dry or plate type rectifier which is of compact form and which occupies but little space axially, so it can be incorporated in or applied to a machine without materially adding to the over-all length thereof.

It is another object of this invention to provide a rectifier of improved form and construction and which is such that it can be used to advantage in electrical generators, or the like, in which it may be utilized to take the place of commutators or slip ring devices such as are usually employed in such machines.

The rectifier of the invention is of the dry plate type or of the type commonly referred to as a selenium type rectifier, although any suitable material or combination of materials may, in practice, be used in its construction or formation. The rectifier forms a unit that is substantially disc-shaped in form being of substantial diameter and of limited extent axially. The unit can be advantageously applied to or mounted on the shaft of a machine, say at one end thereof. In accordance with the invention the rectifier is characterized by a plurality of plate-like elements, one of which may be employed as a support for the others. In a preferred form the plate employed as a mounting is a flat disc-shaped carrier or body of insulating material. The flat carrier of insulating material supports plates of base metal on which rectifier elements occur. In practice the rectifier elements may include bodies of selenium or the like. There is an annular plate of base metal on one side of the carrier concentric therewith and there is a sectional plate on the other side of the carrier establishing an annular series of plate sections concentric with the carrier. The rectifier elements are on the outer sides of the plates. Suitable electric connections or lines to and from the rectifier may extend through the shaft on which the rectifier is mounted and may connect the rectifier with parts such as the field of the machine, the armature of an exciter in the machine, etc.

Figure 6:
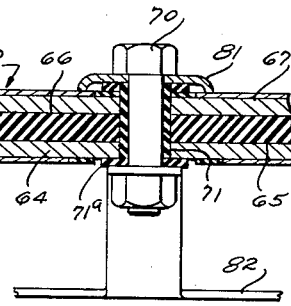
Figure 7:
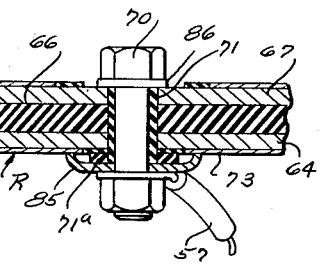
Figure 8:
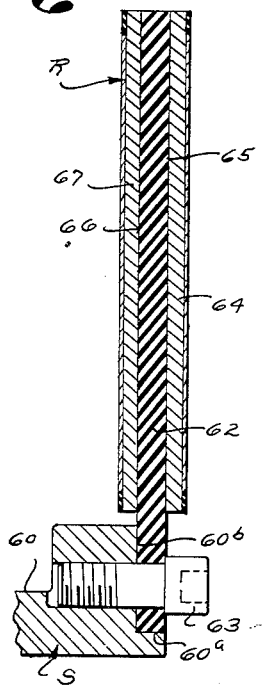
Figure 9:
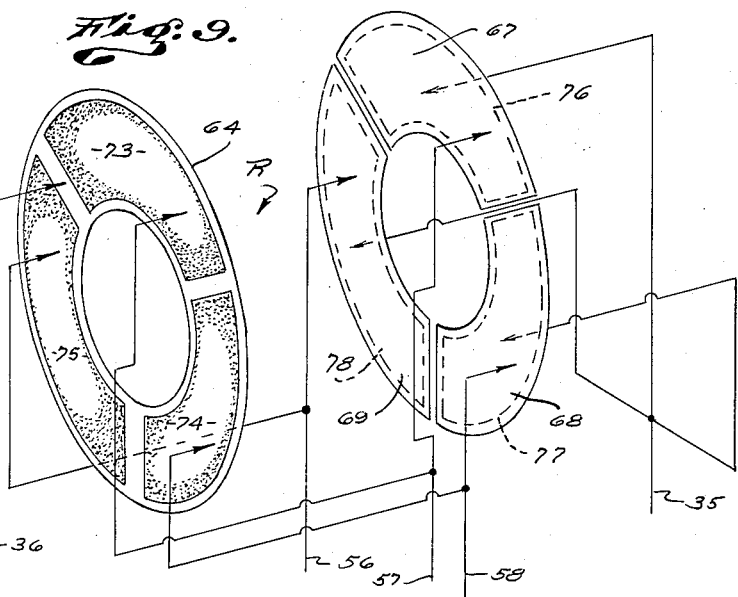
Figure 10:
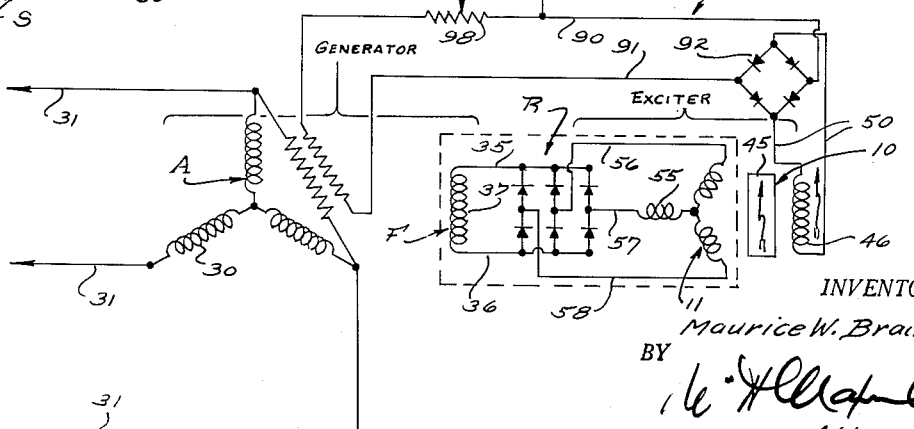

The various objects and features of my invention will be fully understood from the following detailed description of typical preferred forms and applications of the invention, throughout which description reference is made to the accompanying drawings, in which:

Fig. 1 is a side elevation of an electric machine in the nature of a generator and employing a rectifier of the present invention at one end thereof. Fig. 2 is an enlarged detailed transverse sectional view of the rectifier shown in Fig. 1, being a view taken as indicated by line 2—2 on Fig. 1. Fig. 3 is a longitudinal sectional view taken as indicated by line 3—3 on Fig. 2. Fig. 4 is a simple electrical diagram of the rectifier. Figs. 5, 6 and 7 are enlarged detailed sectional views taken on lines 5—5, 6—6 and 7—7, respectively, on Fig. 2. Fig. 8 is an enlarged detailed sectional view taken on line 8—8 on Fig. 2. Fig. 9 is a schematic diagram illustrating the electrical elements and connections involved in the rectifier, and Fig. 10 is an electrical diagram illustrating a typical generator circuit including the rectifier of the present invention.

In a typical application of the rectifier provided by the present invention it may be applied to or incorporated in an electric machine or generator that includes a stationary armature A, a rotating field F on a shaft S, an exciter E, etc. The exciter has a stationary field 10 and a rotating armature 11 and it supplies field current to the main generator through the rectifier R. The rectifier receives alternating current from the exciter E, and delivers direct current to the field F of the generator G. In the particular case illustrated in the diagram (Fig. 10), the field of the exciter is a compound field involving one or more permanent magnets and one or more electromagnetic elements, and a control system C is illustrated receiving power from the main generator and supplying such power to one or more of the electro-magnetic elements of the exciter field to vary the output of the exciter.

In the construction illustrated the machine or generator G involves a case having a cylindrical body 10ª, an end 11ª closing the inner end of the body and an end 12ª closing the outer end of the body. The shaft S is rotatably supported in suitable bearings at the ends of the generator and extends centrally through the body 10ª. The armature A is fixed to the body 10ª of the case and the field assembly F is fixed on the shaft S to operate within the armature.

The shaft S has a drive or power operated section 20 entering the case through the inner end 11ª and has a tubular section 21 joined or coupled to the drive section and extending through the case to carry the field F and to be supported in the bearing at the outer end of the case where it projects to carry the rectifier R.

The armature A is shown as an annular assembly fixed in the body 10ª of the case and the windings 30 of the armature A have suitable lead lines 31 extending from the generator in a cable 32 extending from the exterior of the generator.

The field F of the generator is a suitable assembly fixed on the tubular section or portion 21 of the shaft S to occur within the armature A and lead lines 35 and 36 are connected to the windings 37 of the field and extend through the shaft section 21 to the rectifier R.

The exciter E, which is, in effect, a part or accessory of the main generator G, is shown located within the case of the main generator and is indicated as a simple or conventional alternating current generator involving a fixed or stationary field 10 and a rotating armature 11. The exciter E is shown located or carried within the end 12a of the generator case. The field 10 of exciter E is a compound structure involving permanent magnets 45 and electromagnets involving windings 46. Where the field 10 is a compound structure, as illustrated in the drawings, the windings 46 of the electromagnets thereof may be energized from lead lines 50 carried in a cable 51 entering the case of the generator G and powered from any suitable source.

The armature of the exciter E is fixed on the shaft section 21 to occur within the field structure 10 and the windings 55 (shown as three-phase) of the armature 11 have output leads 56, 57 and 58 that extend from the windings 55 into the shaft section 21 to extend through the shaft to the rectifier R.

In rectifier R, as provided by the present invention, receives the alternating current output from the exciter E and rectifies it to supply direct current to the leads 35 and 36 that extend from the rectifier R to the windings 37 of the field F of generator G. In accordance with the present invention the rectifier R is such that it may be mounted on or carried by the shaft S so that it operates thereon or as a unit with the field F of the generator G and armature 11 of exciter E. The shaft S, field F, armature 11 and rectifier R form the rotor of the machine.

The rectifier of the present invention is a dry or plate type rectifier and may, for example, involve plates carrying rectifier elements which may include selenium, or the like. I will, for purpose of example, refer to the rectifier as involving rectifier elements in the nature of selenium elements or plates related to bodies or plates of base metal. It is to be understood that I may use copper oxide, magnesium-copper sulfide, or any semi-conductive material having a suitable rectifying characteristic, in place of selenium. When I use the term "selenium" I mean to include all equivalents thereof and it is to be understood that in practice the rectifier elements may be formed and applied in accordance with recognized practice.

The particular rectifier illustrated in the drawings is such as to handle or receive three-phase alternating current as it is delivered by the exciter E through the lines 56, 57 and 58, and it delivers or supplies direct current through the lines 35 and 36 for energization of the field F of the generator.

Although the rectifier R may, in practice, vary widely in form, construction and arrangement, it is preferred that it be mounted or carried at the outer end of shaft portion 21 or beyond the outer bearing supporting shaft S, in which case it is, in effect, on the end of shaft S where it may be mounted by means of a shaft extension 60. In the particular case illustrated, it is beyond or outward of the end 12a of the generator case and is enclosed by a separate housing or extension 61 of end 12a (see Fig. 1 of the drawings).

The rectifier construction involves a plurality of plates or plate-like elements and one of these is preferably used as a mounting or carrier for the other. The particular construction illustrated involves a carrier 62 of insulating material, plates of base metal on the carrier and bodies of selenium, or the like, on the plates.

The carrier is shown as a flat round disc of insulating material mounted on the extension 60 by suitable fasteners 63 so that it is concentric with the shaft and is in a plane normal to the axis of the shaft. The carrier has a central opening or bore 60a that receives the shaft extension 60. The fastening means holds the carrier against a shoulder 60b on the shaft.

A plate 64 of suitable base metal, such as aluminum, is arranged at the outer side 65 of the carrier and may be an annular plate arranged concentric with and flat against the carrier. A plate of like base metal at the inner side 66 of the carrier 62 is segmental in form and involves three like base sections 67, 68 and 69, which are flat and arranged in an annular series and flat against the carrier. The sections of the segmental plates are spaced apart.

So far as the present invention is concerned, the plates of base metal above referred to may be mounted on or secured to the carrier 62 in any suitable manner. In the drawings I have illustrated these parts joined or secured together by screw fasteners 70 which extend through openings in the plates or plate sections and through openings in the carrier. The fasteners 70 may be formed of metal or conducting material, in which case insulating bushings 71 are provided on the fasteners and washers 71a of insulating material are employed to insulate the fasteners in the desired manner from the other elements, as shown in Figs. 5, 6 or 7 of the drawings.

The rectifier R includes in addition to the carrier 62 and the base metal plates above-described, rectifier elements such as bodies 73, 74 and 75 including selenium, or the like, on the outer or exposed side of the annular plate 64, and bodies 76, 77 and 78 of selenium, or the like, on the outer sides of plate sections 67, 68 and 69, respectively. In practice the bodies of selenium may be suitably formed or deposited on the plates in the manner commonly employed in rectifier construction, and the bodies may be of such size or extent as to have the desired capacity.

In accordance with a typical and simple electrical system, the base plate 64 of the rectifier is coupled with the lead 36 that extends to the field F of the generator G. To provide a suitable connection between plate 64 and the lead 36, one of the fasteners 70 may be utilized as a terminal or binding post for the lead 36, as shown in Fig. 5 of the drawings, and a washer or contact 80 is carried by the fastener and engages the plate 64 making electrical contact therewith. The other lead 35 to the field F is electrically coupled with the three separate selenium bodies 76, 77 and 78 and these connections may be made by fasteners 70 in the manner shown in Fig. 6 of the drawings where the fasteners 70 located at the said selenium bodies act as terminal or binding posts for the lead 35 and carry contacts 81 that engage and make electrical contact with the said selenium bodies. In the case illustrated a collector or bus member 82 forms a part of the lead 35 and engages the several fasteners 70 that are contacted with the selenium bodies 76, 77 and 78.

The lead lines 56, 57 and 58 from the armature 11 of the exciter E have individual connection with the selenium bodies 73, 74 and 75 on plate 64 and with the body sections 67, 68 and 69 of the other or segmental plate. These several connections can be made by means of fasteners 70 in a manner such as is shown in Fig. 7 of the drawings. One of the leads, namely, 57, is shown connected to a fastener 70 having contact with selenium body 73 through a contact 85 and having contact with plate section 67 through a contact 86. It will be apparent how the other leads from the armature of exciter E may be connected to the other selenium sections on plate 64 and with the plate sections 68 and 69 to complete the circuit as indicated in Figs. 4, 9 and 10 of the drawings.

With the construction and electrical system hereinabove described, as the generator G is operated or driven, the exciter E operates with it and the alternating current generated by the exciter is rectified by the rectifier R so that the rotating field of the generator G is supplied with or excited by direct current.

In practice it is desirable in a machine such as I have set forth to provide a control system C for regulating the action of the generator and when the control system C illustrated in the drawings is employed, the exciter E is provided with a compound field 10 as hereinabove described.

The control system may be of simple form, as shown in diagram, Fig. 10, where the control circuit is energized from the main generator G through a potential transformer T or directly from the output of the generator G if this generated voltage is of suitable magnitude. The control current from the generator G or transformer T is carried by lines 90 and 91 to a suitable rectifier 92 which rectifies the alternating current from the transformer T so that direct current is delivered to lines 50 which connect to the winding or windings 46 of the exciter field. Through this simple arrangement or connection, output from generator G is utilized to energize the electromagnetic field elements of the exciter E. It is to be understood that the exciter field may, if desired, be supplied from any suitable external source such as a battery or suitable generator.

To provide for suitable variation or control, a variable resistance 98 is provided in one of the lines to the rectifier 92. I show a resistance, which may be a simple rheostat or the variable resistance element of any suitable automatic voltage regulator, and I show it located in line 90 between transformer T and rectifier 92. In the particular diagram shown in Fig. 10 the arrows at the permanent magnet 45 and the winding 46 indicate like polarities, in which case the action of these field elements is additive and as a result any energization of windings 46 adds to the power of the field established by the permament magnets 45. In this case the permanent magnet field need be only sufficient to cause enough voltage to be generated to initiate the rectifier action. This starting field or residual magnetism may be obtained by using special materials for elements of the field structure and does not require specially designed permanent magnet poles as shown in the drawings. However, the use of permanent magnet poles, as illustrated, makes voltage build-up certain and increases the voltage stability of the system.

The foregoing description and the structure illustrated in the drawings will serve to make clear a typical use or application of the rectifier that I have provided. Other systems or circuits employing the rectifier are set forth in the companion application hereinabove identified.

From the foregoing description it will be understood that the present invention provides a rectifier that can be used to advantage in place of a commutator or like mechanical device and which therefore simplifies the general construction of such a machine and minimizes or completely reduces difficulties such as ordinarily attend commutators, brush mechanisms, slip rings, etc. The invention can be carried out in rectifiers varying in details of construction from what I have specifically shown and described. In general, the rectifier of the present invention may be termed a dry or plate type rectifier and ordinarily it is advantageous to provide such a rectifier employing bodies of selenium or selenium-like material.

From the drawings it will be noted that the particular form of plate or selenium type rectifier that I have provided is advantageous as it provides a structure that is of limited size both radially and axially and is such that it can be readily mounted on the rotor or shaft of an electric machine such as the generator to operate therewith without any unbalancing effect or other mechanical complications. The rectifier is preferably mounted on the shaft S so that it is concentric therewith and in a preferred arrangement it is mounted at the exterior of the generator case so that it is readily accessible for replacement and repair, as may be necessary. In the particular structure illustrated the various parts are shown extended axially of the generator considerably more than is necessary in practice.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A rectifier adapted to be fixed to the rotor of an electric machine including, a disc-shaped body of electrical insulating material with a central portion adapted to be secured to the rotor concentric therewith, base metal plates on opposite sides of the body outward of the central portion, and rectifier elements on the outer sides of the plates, one of the plates being annular and substantially concentric with the central portion of the body and the other including spaced sections in an annular series substantially concentric with the central portion of the body.

2. A rectifier adapted to be secured to the shaft of a rotor in an electric machine including, a disc-shaped body of electrical insulating material with a central portion adapted to be secured to the shaft concentric therewith, base metal plates on opposite sides of the carrier, and rectifier elements on the outer sides of the plates, one of the plates being annular substantially concentric with said central portion and the other including spaced sections in an annular series substantially concentric with said central portion, there being an annular series of spaced rectifier elements on the annular plate and rectifier elements on the sections of the other plates.

3. A rectifier adapted to be applied to the shaft of the rotor of an electric machine including, a flat disc-shaped carrier of electrical insulating material having a central shaft receiving portion adapted to be fixed to the shaft, an annular flat base metal plate on one side of the carrier concentric with said portion, an annular series of spaced flat plate sections of base metal on the opposite side of the carrier, said series of sections being concentric with said central portion of the carrier, and rectifier elements on the annular plate and on the plate sections and each with one side exposed.

4. A rectifier adapted to be applied to a tubular rotor shaft of an electric machine including, a disc-shaped carrier of electrical insulating material having an apertured central portion adapted to be secured to the shaft with the carrier concentric therewith, an annular base metal plate on one side of the carrier concentric with said central portion, an annular series of spaced plate sections of base metal on the opposite side of the carrier, said series being concentric with said central portion, rectifier elements on the annular plate and on the plate sections, and conductors extending through the central portion of the carrier and adapted to enter the shaft, one conductor being connected to the elements on the annular plate and another to each of the elements on the plate sections.

5. A rectifier applicable to a shaft including, a disc-shaped carrier of electrical insulating material having a central portion adapted to receive a shaft, an annular base metal plate on one side of the carrier concentric with said portion, an annular series of plate sections of base metal on the opposite side of the carrier, said series being concentric with said portion, fasteners releasably securing the annular plate and plate sections to the carrier, and rectifier elements on the annular plate and on the plate sections.

6. A rectifier applicable to a shaft including, a disc-shaped carrier of electrical insulating material having a central portion adapted to receive a shaft, an annular base metal plate on one side of the carrier concentric with said portion, an annular series of plate sections of base metal on the opposite side of the carrier, said series being concentric with said portion, fasteners releasably securing the annular plate and plate sections to the carrier, and rectifier elements on the annular plate and on the plate sections, one fastener having electrical connection with the annular plate and being adapted to receive an electrical conductor.

7. A rectifier applicable to a shaft including, a disc-shaped carrier of electrical insulating material having a central portion adapted to receive a shaft, an annular base metal plate on one side of the carrier concentric with said portion, an annular series of plate sections of base metal on the opposite side of the carrier, said series being concentric with said portion, fasteners releasably securing the annular plate and plate sections to the carrier, and rectifier elements on the annular plate and on the plate sections, one fastener having electrical connection with the annular plate and being adapted to receive an electrical conductor and other fasteners each having electrical connection with one plate section and adapted to receive an electrical connector.

8. A rectifier applicable to a shaft including, a disc-shaped carrier of electrical insulating material having a central portion adapted to receive a shaft, an annular base metal plate on one side of the carrier concentric with said portion, an annular series of plate sections of base metal on the opposite side of the carrier, said series being concentric with said portion, fasteners releasably securing the annular plate and plate sections to the carrier, rectifier elements on the annular plate and on the plate sections, one fastener having electrical connection with the annular plate and being adapted to receive an electrical conductor and other fasteners each having electrical connection with one plate section, and a buss bar having connection with each of said other fasteners.

9. In an electric machine, a rotor including a shaft mounted to rotate, and a rectifier including, a substantially flat carrier of electrical insulating material fixed to the shaft in a plane substantially normal to the axis of the shaft, base metal plates on opposite sides of the carrier, a plate on one side of said carrier being in a single section, a plate on the opposite side of said carrier being in a plurality of spaced sections lying in a common plane, and rectifier elements on said plate.

10. In an electric machine, a rotor including a shaft mounted to rotate, and having an accessible end portion and a rectifier including, a substantially flat carrier of electrical insulating material, mounting means securing the carrier to the said end portion of the shaft in a plane substantially normal to the axis of the shaft, base metal plates on opposite sides of the carrier, a plate on one side of said carrier being in a single section, a plate on the opposite side of said carrier being in a plurality of spaced sections lying in a common plane, and rectifier elements on said plates.

11. In an electric machine, a rotor including a shaft mounted to rotate, and a rectifier including, a disc-shaped body of electrical insulating material, means mounting the body on the shaft substantially concentric therewith, base metal plates fixed on opposite sides of the carrier, a plate on one side of said carrier being in a single section, a plate on the opposite side of said carrier being in a plurality of spaced sections, and rectifier elements on the outer sides of said plates.

12. In an electric machine, a rotor including a shaft mounted to rotate, and a rectifier including a disc-shaped body of electrical insulating material with a central portion secured to the shaft, the body being in a plane substantially normal to the axis of the shaft, base metal plates on opposite sides of the body outward of the central portion of the body, and rectifier elements on the sides of the plates remote from the body, one of the plates being annular in form and substantially concentric with the central portion of the body and the other including spaced sections in an annular series substantially concentric with the central portion of the body.

13. In an electric machine, a rotor including a shaft mounted to rotate, and a rectifier including a disc-shaped body of electrical insulating material with a central portion secured to the shaft, the body being in a plane substantially normal to the axis of the shaft, base metal plates on opposite sides of the body outward of the central portion of the body, and rectifier elements on the sides of the plates remote from the body, one of the plates being annular in form and substantially concentric with the central portion of the body and the other including spaced sections in an annular series substantially concentric with the central portion of the body, the annular plate having an annular series of spaced rectifier elements thereon and the sectional plates having a rectifier element on each section thereof.

14. In an electric machine, a rotor including a shaft, mounted to rotate and having a longitudinal passage therein, and a rectifier including, a disc-shaped carrier of electrical insulating material and having a central portion with an opening through it and secured to the shaft with the opening in communication with the passage, an annular base metal plate on one side of the carrier concentric with said central portion, an annular series of spaced plate sections of base metal on the opposite side of the carrier, said series being concentric with said central portion, rectifier elements on the annular plate and on the plate sections, and conductors extending through the passage and the opening, one conductor being connected to the elements on the annular plates and another being connected to the elements on the plate sections.

15. In an electric machine including a rotor with a shaft mounted for rotation, a rectifier including a disc-shaped carrier of electrical insulating material having a central portion secured to the shaft, an annular base metal plate on one side of the carrier concentric with said portion, an annular series of plate sections of base metal on the opposite side of the carrier, said series being concentric with said portion, fasteners releasably securing the annular plate and plate sections to the carrier, rectifier elements on the annular plate and on the plate sections, one fastener having electrical connection with the annular plate and being adapted to receive an electrical conductor and other fasteners each having electrical connection with one plate section, and a buss bar having connection with each of said other fasteners.

16. In an electrical machine having a unitary rotor with a rotatably mounted shaft, and a rectifier including a carrier of electrical insulation adapted to be secured to the shaft, base metal plates on opposite sides of the carrier, one in a continuous plate and the other a sectional plate including a plurality of separated sections, and a plurality of rectifier elements, there being one element on each section of said other plate, and there being a plurality of elements spaced apart on the first-mentioned plate.

17. A rectifier of the character described including, a carrier of electrical insulation, base metal plates on the carrier, one in a single section and another in a plurality of symmetrically spaced separated sections, and a plurality of rectifier elements, there being one element on each section of said other plate and adapted to deliver direct current, and there being a plurality of elements symmetrically spaced apart on the first-mentioned plate adapted to receive alternating current from an exciter.

References Cited in the file of this patent

UNITED STATES PATENTS

| 2,215,667 | Sherman | Sept. 24, 1940 |
| 2,353,461 | Hamann | July 11, 1944 |
| 2,395,059 | Morris | Feb. 19, 1946 |
| 2,471,011 | Shapiro | May 24, 1949 |
| 2,486,110 | Bugel | Oct. 25, 1949 |
| 2,525,495 | Lynn | Oct. 10, 1950 |
| 2,550,710 | Morris | May 1, 1951 |
| 2,629,853 | Harder et al. | Feb. 24, 1953 |
| 2,634,379 | Brainard | Apr. 7, 1953 |
| 2,665,334 | Brainard | Jan. 5, 1954 |
| 2,665,398 | Brainard | Jan. 5, 1954 |